United States Patent Office 3,527,447
Patented Sept. 8, 1970

3,527,447
PROCESS FOR THE PREPARATION
OF CALCINED GYPSUM
William A. Kinkade, Lisle, and Robert E. McCleary,
Geneva, Ill., assignors to United States Gypsum Company, Chicago, Ill., a corporation of Delaware
No Drawing. Filed Dec. 23, 1968, Ser. No. 786,450
Int. Cl. C04b 1/14
U.S. Cl. 263—53                                  9 Claims

ABSTRACT OF THE DISCLOSURE

In a process for producing a calcined gypsum to produce a calcium sulfate hemihydrate having properties which are resistant to change on aging which comprises treating a mass of hot calcined gypsum by adding thereto, with agitation, liquid water in an amount sufficient to reduce a portion of the mass to a temperature below the boiling point of water and thereafter removing the free moisture from the mass, the improvement which comprises subjecting the admixture to sub-atmospheric pressures for a time sufficient to reduce the combined moisture content of the mass to an amount approximately that calculated for the hemi-hydrate while maintaining the temperature below about the boiling point of water.

CROSS-REFERENCE TO RELATED APPLICATION

This application is an improvement on the subject matter disclosed in our application Ser. No. 608,483, filed Jan. 11, 1967, now U.S. Pat. No. 3,415,910.

BACKGROUND OF THE INVENTION

Field of the invention

This invention relates to the production of an improved calcined gypsum or calcium sulfate hemihydrate whose properties in general and especially set time, pouring consistency, potential for strength development and other properties, are resistant to change upon aging. More specifically it relates to an improved method for producing a low consistency calcined gypsum (or stucco) which can be used to produce high density, high strength casts.

The art has long recognized that kettle stucco upon aging changed its properties, most notably its normal consistency or water demand and sand carrying capacity. Because this aging was known to result in a product of lower consistency which in use produced stronger casts, attempts were made to produce artificially aged material.

DESCRIPTION OF THE PRIOR ART

The prior art relating to this subject matter is described in our aforementioned Pat. No. 3,415,910. Generally, the prior art, such as for example, McAnally U.S. Pat. No. 1,713,879 (May 21, 1929) recognized the desirability of artificially aged stucco materials and sought to accomplish this end by the addition of water to a calcined single or double-boiled gypsum over a brief period. Marsh in U.S. Pat. No. 2,177,668 (Oct. 31, 1939) describes an aging process that was accomplished by quenching the thirst of the plaster by exposure of calcined gypsum to a humidified gas. Neither of these methods produced a product which was entirely satisfactory from the point of view of consistently obtaining a product with commercially uniformly satisfactory properties.

SUMMARY OF THE INVENTION

This invention relates to a process for treating a mass of hot calcined stucco to produce a calcium sulfate hemihydrate having properties which are resistant to change on aging which process comprises adding with agitation liquid water to a hot calcined stucco in a quantity sufficient to reduce the temperature below the boiling point of water and removing the free water present in the admixture, the improvement which comprises removing the liquid water by subjecting the admixture of stucco and water to pressures below normal atmospheric pressure for a period of time sufficient to reduce the water content of the mass to an amount approximately that calculated for the hemihydrate.

The process of this invention may be practiced on previously produced dispersable stuccos but in one preferred embodiment it includes the preparation of the stucco in a kettle. The kettle calcination desirably should be continued until the temperature of the calcining mass is more than about 250° F., preferably above about 285° F., and most preferably it should be in the range of about 300° F. to 310° F., at which temperature the combined moisture of the contents usually is slightly less than a theoretical value which can be calculated for the hemihydrate based on the purity of the rock being calcined. Satisfactory results were achieved even when higher temperatures were reached and a calcination was carried into the second boil or active anhydrite stage. Stucco which reached a temperature of from 380° F. to about 500° F. has been successfully treated according to this invention. Accordingly at this point in the calcination process, liquid water is added rapidly to the calcined mass. The amount of water added is desirably more than enough to convert any active anhydrite to the hemihydrate. The temperature reached in the admixture of stucco and liquid water during the water addition or quench step depends to a certain extent upon the amount of water added and the amount of heat stored in the chamber where quenching takes place such as the refractory surrounding the calcining kettle, but a temperature between about 155° F. and about the boiling point of water is satisfactory, and from about 180° F. to about 200° F. is preferred. After the addition of water or quench step, the admixture is subjected to pressures below normal atmospheric pressure. This process step can be carried out in any suitable chamber in which the pressure can be controlled. If desired, the process can be carried out within the calcining vessel such as, for example, a calcining kettle, which has been adapted for that purpose. Sub-atmospheric pressures which are useful in this process broadly may be as high as about 90% of normal atmospheric pressure. Preferably the pressure is at a level of up to 50% of normal atmospheric pressure, and most preferably up to about 5% or 10% of normal atmospheric pressure. The pressures in this application are absolute pressures unless otherwise identified.

The time necessary to remove the excess water and reduce the water content of the mass to an amount approximately that calculated for the hemihydrate will vary depending upon the pressure which is utilized. With pressures approaching atmospheric pressure, the time required to reduce the water content of the mass will be considerably greater than say for processes which employ an absolute pressure of less than 5% of normal atmospheric pressure.

It should be understood that in transforming the excess liquid water from the liquid state to the vapor state, a certain amount of residual heat is required. In a preferred processing operation the stucco is quenched when the calcination is completed and the quenched stucco is at a temperature slightly below the boiling point of water and hence has sufficient residual heat to transform the liquid water to the vapor state. The process is generally self-balancing with respect to heat since subjecting the mass of gypsum and liquid water to reduced pressures results in a temperature drop as the water is transformed to the vapor state and the required heat is withdrawn from the mass. In some instances it may be desirable to add additional heat to the mass by means of heat transfer through the chamber walls.

In a most preferred aspect of this invention, it is desired that the chamber walls be heated to a temperature above the dew point for the particular vapor pressure encountered in the process. This heating of the chamber walls essentially precludes the condensation of vapor on the walls of the vessel, and contact with the hemihydrate in the vessel with the condensate to form dihydrate. It should also be understood that the amount of heat supplied to the walls of the chamber or vessel utilized for the removal of excess water at sub-atmospheric pressure should be such to maintain the temperature of the contents of the vessel (calcined gypsum and water) below the boiling point of water to thereby minimize any substantial amount of calcination of the mass or any part of the mass.

Supplementary heat to supply the necessary heat of vaporization to the liquid water in the mass of quenched stucco may be provided in the form of heating microwaves in the government authorized range about 2450 megahertz or about 12 cm. or as may be extended by further government regulations. Conventional equipment used to supply microwave heating is available as the so called radar range or its industrial counterpart. When microwaves are used for heating, the mass of quenched calcined gypsum is maintained in a chamber at sub-atmospheric pressure and subjected to the microwaves. It is necessary to employ a chamber with a surface or surfaces which are essentially transparent to and unaffected by the microwaves, such as for example, glass. The same observations with respect to maintaining the temperature of the mass of stucco and water below the boiling point of water are also observed in the case when supplemental heating thereof by microwaves or otherwise is employed.

Although microwave heating has the advantage of directly heating the mixture and thereby avoiding the expenditure of large amounts of energy in heating the equipment used in the process, the walls of the vessel should, as indicated in the foregoing, be maintained at a temperature above the dew point to avoid condensation. Accordingly, two forms of supplemental heating may, if desired, be employed in this invention, microwaves and conventional.

It is also a preferred aspect of this invention to sweep the chamber used to remove liquid water with a stream of gas such as air, to assist in the removal of water. The gas stream should be minor in volume with respect to the chamber or vessel employed, so as to not substantially affect or reduce the subatmospheric pressure maintained in the chamber.

The vacuum or subatmospheric pressure in the chamber may be obtained by the use of vacuum pumps, or aspirators, such as water aspirators or steam jets. Since fine particles of dust may be entrained in the stream of water vapor being removed, it is preferred that the system for maintaining reduced pressure be either inherently unaffected by entrained fines or suitably trapped to remove them from the air stream.

DESCRIPTION OF THE PREFERRED EMBODIMENTS

The following examples will illustrate various specific embodiments of the process of the present invention.

Example I

A mass of 1000 parts by weight calcined gypsum prepared by the continuous kettle calcination process was quenched with liquid water (4% by weight), permitted to cool to 125° F. to 150° F., and placed in a vacuum chamber. The mass was subjected to reduced pressure of about 0.3 in. of mercury absolute (29" Hg vacuum). The walls of the chamber were heated to 190° F.–200° F. to maintain the same above the dew point. The vacuum was maintained for a period of about 1 hour, sufficient to reduce the water content of the mass below that calculated for the hemihydrate and the stucco product was removed from the chamber. A small jet of air was introduced into the chamber to help sweep out the water vapor. The stucco product had the following properties:

Dispersed consistency—100 cc.
Dispersed surface area—20,200 cm.$^2$/gm.
Hand mix consistency—63 cc.
Vicat set—30 min.
Combined water—6.5%

Example II

The procedure of Example I was repeated using, however, supplemental heating in the form of microwaves at about 12.2 cm. wavelength. The time employed was above 35 to 40 minutes. The heating was carried out in a chamber transparent to microwaves. Additional heat was provided to maintain the walls of the vessel above the dew point to prevent condensation of water and consequent formation of dihydrate. The following results were obtained:

Dispersed consistency—104 cc.
Dispersed surface area—20,400 cm.$^2$/gm.
Combined water—4%

The calcined gypsum products produced by the improved process of this invention are characterized by good hand mix consistencies on the order of 60 to 70 cc., and suitable set times (vicat set). The process is especially useful in that it permits careful control of the conditions used in the removal of water. In our aforementioned Pat. No. 3,415,910, the water removal step involved reheating of the gypsum mass as the sole mode of reducing moisture to the desired levels. The use of vacuum or reduced pressure permits removal of water under conditions that minimize the opportunity for over-calcination to anhydrite to occur. Even in those cases where supplemental heating is used, the quantity of heat added and the temperatures employed are sufficiently low so that over-calcination is not a problem.

While several particular embodiments of the invention have been illustrated, it can be appreciated that many modifications are possible which are within the spirit and scope of the invention.

We claim:

1. A process for treating a mass of hot calcined stucco to produce a calcium sulfate hemihydrate having properties which are resistant to change on aging which process comprises adding with agitation liquid water to a hot calcined stucco in a quantity sufficient to reduce the temperature below the boiling point of water and removing the free water present in the admixture, the improvement which comprises subjecting the admixture of stucco and water in a treating chamber to pressures below normal atmospheric pressure for a period of time sufficient to reduce the water content of the mass to an amount approximately that calculated for the hemihydrate while maintaining the mass at a temperature up to about the boiling point of water.

2. A process according to claim 1 wherein the pressures utilized are at a level of up to about 50% of normal atmospheric pressure.

3. A process according to claim 1 wherein supplemental heat is added to the admixture of stucco and water while being subjected to subatmospheric pressures.

4. A process according to claim 3 wherein the supplemental heating is provided by microwaves and the process is carried out in equipment substantially transparent to and unaffected by the microwaves.

5. A process according to claim 1 wherein the treating chamber walls are heated to maintain the same above the dew point.

6. A process according to claim 1 wherein the below normal atmospheric pressure is produced by a water aspirator.

7. A process according to claim 1 wherein the below normal atmospheric pressure is produced by a steam jet.

8. A process according to claim 1 wherein the treating chamber is swept with a gas stream to remove water vapor.

9. A process according to claim 1 wherein the pressures utilized are up to about 50% of normal atmospheric pressure.

References Cited
UNITED STATES PATENTS

| | | | |
|---|---|---|---|
| 2,907,668 | 10/1959 | Nies et al. | 263—53 |
| 3,415,910 | 12/1968 | Kinkade et al. | 263—53 |

JOHN J. CAMBY, Primary Examiner